United States Patent
Aizen

[19]

[11] Patent Number: 6,007,215
[45] Date of Patent: Dec. 28, 1999

[54] MOUNTING LIGHT PLATE

[76] Inventor: Rickey J. Aizen, 1104 Lee Dr., Thibodaux, La. 70301

[21] Appl. No.: 09/036,426

[22] Filed: Mar. 5, 1998

[51] Int. Cl.⁶ .......................................................... F21S 1/00
[52] U.S. Cl. ............................ 362/145; 362/382; 362/404
[58] Field of Search .................................... 362/145, 147, 362/368, 404, 249, 382; 248/343

[56] References Cited

U.S. PATENT DOCUMENTS

| | | | |
|---|---|---|---|
| 4,130,858 | 12/1978 | Hayakawa | 362/404 X |
| 4,591,764 | 5/1986 | Nilssen | 362/404 X |
| 4,814,953 | 3/1989 | Distasio | 362/404 X |
| 5,623,789 | 4/1997 | Kidwell et al. | 248/343 X |

*Primary Examiner*—Stephen Husar

[57] ABSTRACT

A flood light mounting plate is provided including an upper extent having a hollow extension coupled to a recipient surface of a house structure and extending therefrom for coupling with a light assembly at an end thereof. Also included is a lower extent defining a flange extended from a bottom end of the extension for encompassing a vinyl soffit.

7 Claims, 3 Drawing Sheets

MOUNTING LIGHT PLATE

BACKGROUND OF THE INVENTION

1. Field of the Invention

The present invention relates to light mounting devices and more particularly pertains to a new mounting light plate for mounting a light anywhere along the 45 degree juncture of a vinyl soffit at the corner of a residence.

2. Description of the Prior Art

The use of light mounting devices is known in the prior art. More specifically, light mounting devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art light mounting devices include U.S. Pat. No. 5,259,774; U.S. Pat. No. 4,814,953; U.S. Pat. No. 4,731,710; U.S. Pat. Des. 318,139; U.S. Pat. No. 4,591,139; U.S. Pat. No. 4,591,764; and U.S. Pat. No. 4,130,858.

In these respects, the mounting light plate according to the present invention substantially departs from the conventional concepts and designs of the prior art, and in so doing provides an apparatus primarily developed for the purpose of mounting a light anywhere along the 45 degree juncture of a vinyl soffit at the corner of a residence.

SUMMARY OF THE INVENTION

In view of the foregoing disadvantages inherent in the known types of light mounting devices now present in the prior art, the present invention provides a new mounting light plate construction wherein the same can be utilized for mounting a light anywhere along the 45 degree juncture of a vinyl soffit at the corner of a residence.

The general purpose of the present invention, which will be described subsequently in greater detail, is to provide a new mounting light plate apparatus and method which has many of the advantages of the light mounting devices mentioned heretofore and many novel features that result in a new mounting light plate which is not anticipated, rendered obvious, suggested, or even implied by any of the prior art light mounting devices, either alone or in any combination thereof.

To attain this, the present invention generally comprises an upper extent having a circular configuration including a top face, a bottom face, and a periphery formed therebetween. The bottom face has an extension defined by a portion of a hollow cylinder integrally coupled thereto and extending downwardly therefrom. As shown in FIG. 1, the cylinder has a diameter which is less than that of the top face. A plurality of posts are provided each having a semi-cylindrical configuration with an upper face coupled to the bottom face of the upper extent. A generally planar peripheral face of each post is integrally coupled to an inner periphery of the extension such that the post extends past the extension. A threaded bore is formed in a lower face of the post. The upper extent further includes a circular bore formed in a central extent thereof. A plurality of elongated mounting slots are formed about a periphery of the circular bore and extended radially therefrom. A pair of rectangular cut outs are formed in the upper extent at diametrically opposed points thereon. Such cut outs extend from the extension to the periphery of the top face. A pair of inverted T-shaped embossments are each integrally coupled to an outer periphery of the extension. Each embossment is positioned such that a vertical portion thereof remains in alignment with an associated one of the rectangular cut outs. FIG. 2 shows a pair of generally rectangular inset portions each formed in the top face of the upper extent about the corresponding rectangular cut out. Next provided is an annular lower extent having a top face, a bottom face, an outer periphery and an inner periphery. The top face of the lower extent has a pair of diametrically opposed generally rectangular inset portions formed therein for receiving a horizontal portion of an associated one of the embossments. See FIG. 2. The outer periphery has a lip integrally coupled thereto which extends upwardly therefrom between the inset portions of the lower extent.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new mounting light plate apparatus and method which has many of the advantages of the light mounting devices mentioned heretofore and many novel features that result in a new mounting light plate which is not anticipated, rendered obvious, suggested, or even implied by any of the prior art light mounting devices, either alone or in any combination thereof.

It is another object of the present invention to provide a new mounting light plate which may be easily and efficiently manufactured and marketed.

It is a further object of the present invention to provide a new mounting light plate which is of a durable and reliable construction.

An even further object of the present invention is to provide a new mounting light plate which is susceptible of a low cost of manufacture with regard to both materials and labor, and which accordingly is then susceptible of low prices of sale to the consuming public, thereby making such mounting light plate economically available to the buying public.

Still yet another object of the present invention is to provide a new mounting light plate which provides in the apparatuses and methods of the prior art some of the advantages thereof, while simultaneously overcoming some of the disadvantages normally associated therewith.

Still another object of the present invention is to provide a new mounting light plate for mounting a light anywhere along the 45 degree juncture of a vinyl soffit at the corner of a residence.

Even still another object of the present invention is to provide a new mounting light plate that includes an upper extent having a circular configuration with a top face, a bottom face, and a periphery formed therebetween. The bottom face has an extension coupled thereto and extended downwardly therefrom. A plurality of posts are coupled to the bottom face and each have a threaded bore formed therein. The upper extent further includes a bore formed in a central extent thereof, a plurality of mounting slots, and a pair of cut outs formed therein at diametrically opposed points thereon with the cut outs extending from the extension to the periphery of the top face. A pair of inset portions are each formed in the top face of the upper extent about the corresponding cut out.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
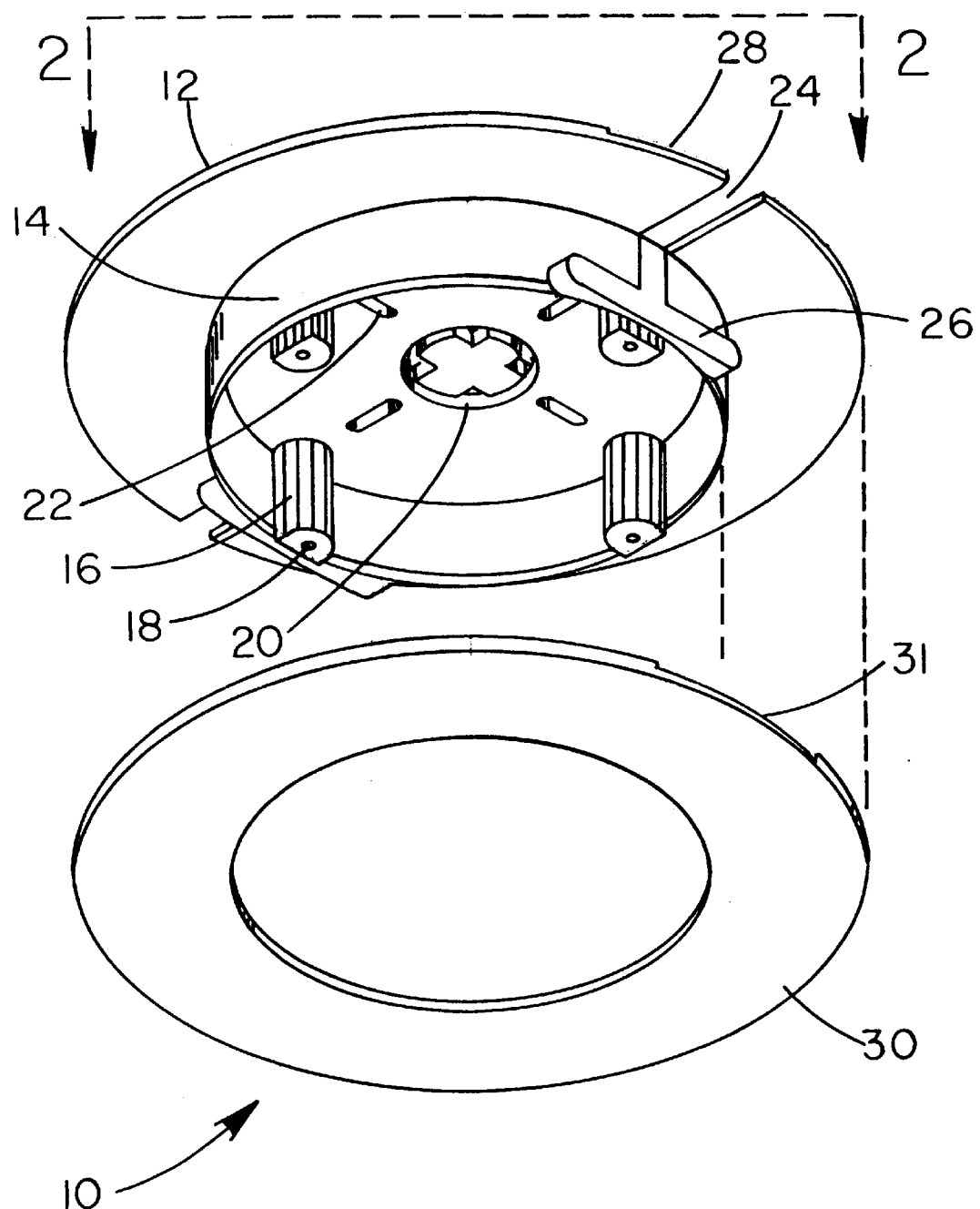
FIG. 1 is an exploded view of a new mounting light plate according to the present invention with the upper extent and lower extent separated for viewing an internal structure of present invention.
Figure 2:
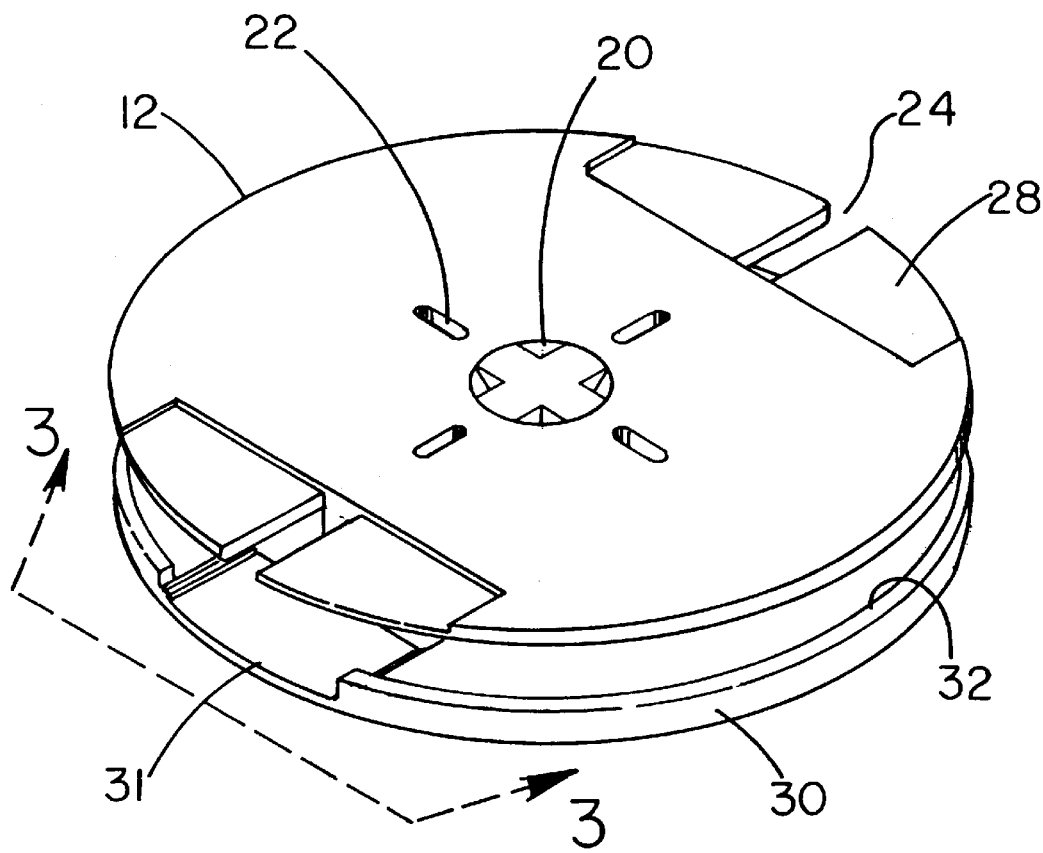
FIG. 2 is a top perspective view of the present invention.
Figure 3:
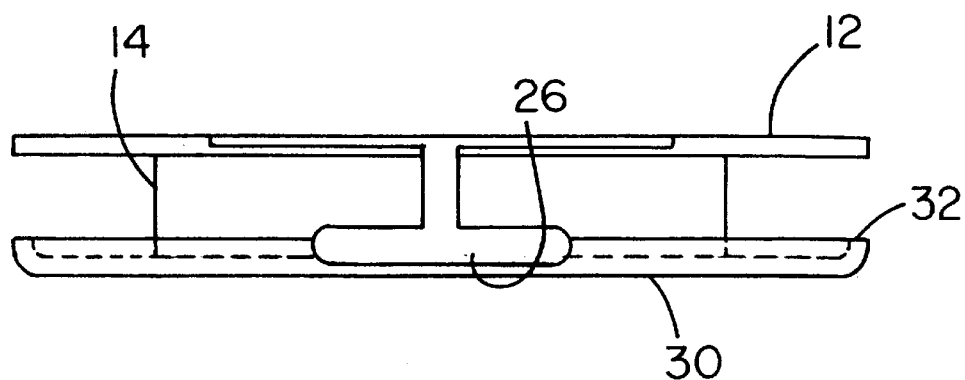
FIG. 3 is a side view of the present invention.

With reference now to the drawings, and in particular to FIGS. 1 through 3 thereof, a new mounting light plate embodying the principles and concepts of the present invention and generally designated by the reference numeral 10 will be described.

The present invention, as designated as numeral 10, includes an upper extent 12 having a circular configuration including a top face, a bottom face, and a periphery formed therebetween. The bottom face has an extension 14 defined by a portion of a hollow cylinder integrally coupled thereto and extending downwardly therefrom. As shown in FIG. 1, the cylinder has a diameter which is less than that of the top face. A plurality of posts 16 are provided each having a semi-cylindrical configuration with an upper face coupled to the bottom face of the upper extent. A generally planar peripheral face of each post is integrally coupled to an inner periphery of the extension such that the post protrudes past the extension. A threaded bore 18 is formed in a lower face of each post for mounting a floodlight thereon.

The upper extent further includes a circular bore 20 formed in a central extent thereof. As an option, a cross-shaped knock-out may be formed in the bore and can be removed. A plurality of elongated mounting slots 22 are formed about a periphery of the circular bore and extended radially therefrom. Such mounting slots are adapted for mounting the upper extent to a house structure. A pair of rectangular cut outs 24 are formed in the upper extent at diametrically opposed points thereon. Such cut outs extend from the extension to the periphery of the upper extent. A pair of inverted T-shaped embossments 26 are each integrally coupled to an outer periphery of the extension. Each embossment is positioned such that a vertical portion thereof remains in alignment with an associated one of the rectangular cut outs. FIG. 2 shows a pair of generally rectangular inset portions 28 each formed in the top face of the upper extent about the corresponding rectangular cut out.

Next provided is an annular lower extent 30 having a top face, a bottom face, an outer periphery and an inner periphery. While shown separated in FIG. 1, it should be noted that the inner periphery of the lower extent is integrally coupled to the extension of the upper extent. The top face of the lower extent has a pair of diametrically opposed generally rectangular inset portions 31 formed therein for receiving a horizontal portion of an associated one of the embossments. See FIG. 3. The outer periphery has a lip 32 integrally coupled thereto which extends upwardly therefrom between the inset portions of the lower extent. The upper and lower extent define an upper and lower flange, as shown in FIG. 3.

Figure 4:
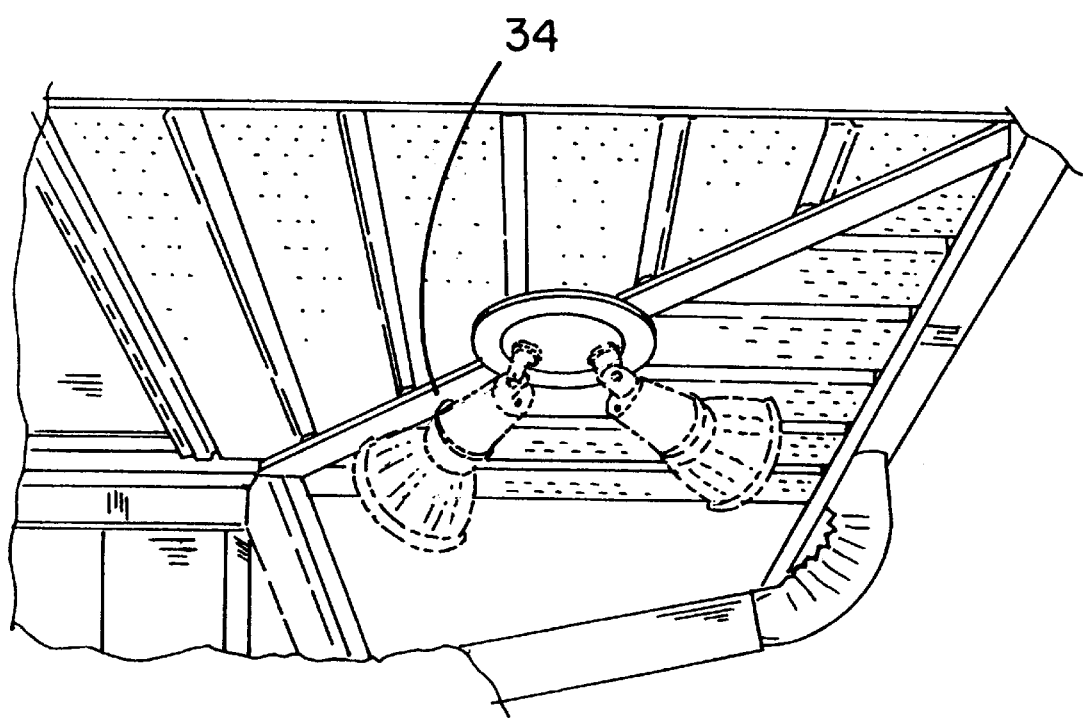
FIG. 4 is a perspective view of the present invention in its intended environment.

The present invention permits homeowners to install flood or spotlights anywhere along the 45 degree juncture of a vinyl soffit at the corner of a residence. As shown in FIG. 4, inverted T-shaped channels 34, normally used at this juncture for assuring a good watertight seal, do not permit the installation of a standard electrical box along this line. During installation, the T-shaped channel is split to defined a space for mounting the present invention directly to the house structure. Further, the vinyl soffit is cut to encompass the extension of the present invention. The aforementioned upper and lower flanges are spaced far enough apart so that the T-shaped channels are situated therebetween. This spacing should also allow enough depth for the necessary electrical connections in the extension of the present invention. A water tight seal is afforded when the light assembly is mounted to a bottom of the present invention to protect the electrical connections. It should be understood that in addition to this application, the present invention may be used on exterior walls, overhead areas of patios or porches, or carports.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A flood light mounting plate comprising, in combination:

an upper extent having a circular configuration including a top face, a bottom face, and a periphery formed therebetween, the bottom face having an extension defined by a portion of a hollow cylinder integrally coupled thereto and extending downwardly therefrom with the cylinder having a diameter which is less than that of the top face, a plurality of posts each having a semi-cylindrical configuration with an upper face coupled to the bottom face of the upper extent, a generally planar peripheral face integrally coupled to an inner periphery of the extension such that the post extends past the extension and a threaded bore formed in a lower face of the post, the upper extent further including a circular bore formed in a central extent thereof, a plurality of elongated mounting slots formed about a periphery of the circular bore and extending radially therefrom, a pair of rectangular cut outs formed therein at diametrically opposed points thereon with the cut outs extending from the extension to the periphery of the top face, a pair of inverted T-shaped embossments each integrally coupled to an outer periphery of the extension with a vertical portion thereof in alignment with an associated one of the rectangular cut outs, and a pair of generally rectangular inset portions each formed in the top face of the upper extent about the corresponding rectangular cut out; and an annular lower extent having a top face, a bottom face, an outer periphery and an inner periphery, the top face of the lower extent having a pair of diametrically opposed generally rectangular inset portions formed therein for receiving a horizontal portion of an associated one of the embossments, the outer periphery having a lip integrally coupled thereto and extending upwardly therefrom between the inset portions of the lower extent.

2. A flood light mounting plate comprising:

an upper extent including a hollow extension coupled to a recipient surface of a house structure and extending therefrom for coupling with a light assembly at an end thereof; and a lower extent defining a flange extended from a bottom end of the extension for encompassing a vinyl soffit.

3. A flood light mounting plate as set forth in claim 2 wherein the upper extent has a top face with a pair of diametrically opposed cut outs formed therein for receiving therein T-shaped channels associated with the vinyl soffit.

4. A flood light mounting plate as set forth in claim 3 wherein the top face has a diameter greater than that of the extension.

5. A flood light mounting plate as set forth in claim 2 wherein the upper extent includes slots for coupling with the light assembly.

6. A flood light mounting plate as set forth in claim 2 wherein the mounting plate further includes threaded bores for coupling with the house structure.

7. A flood light mounting plate as set forth in claim 2 wherein a cut out is formed in the upper extent for allowing passage of electrical wires from the house structure.

* * * * *